Figure 1:
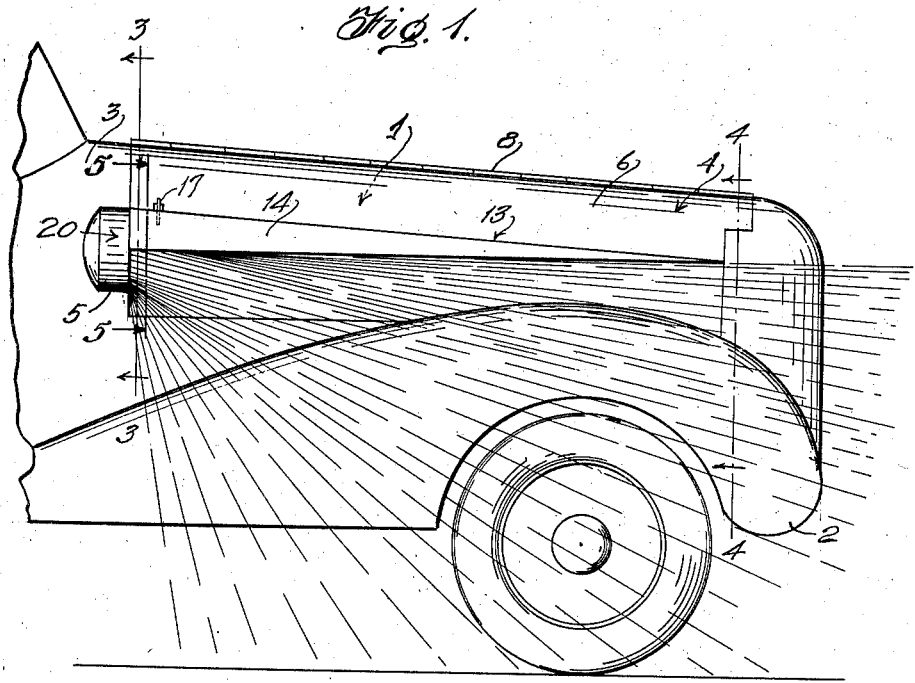

Feb. 21, 1939.  E. E. EMONS  2,148,341
GLARE PREVENTIVE SYSTEM
Filed Aug. 5, 1937  3 Sheets-Sheet 1

Inventor
ERNEST E. EMONS,
By Kimmel & Crowell
Attorneys.

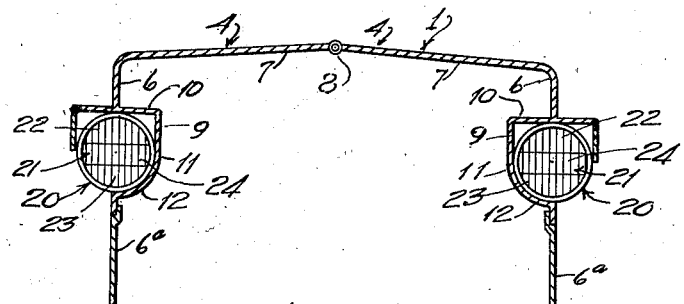
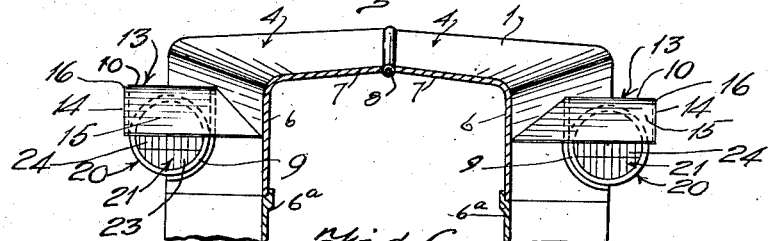
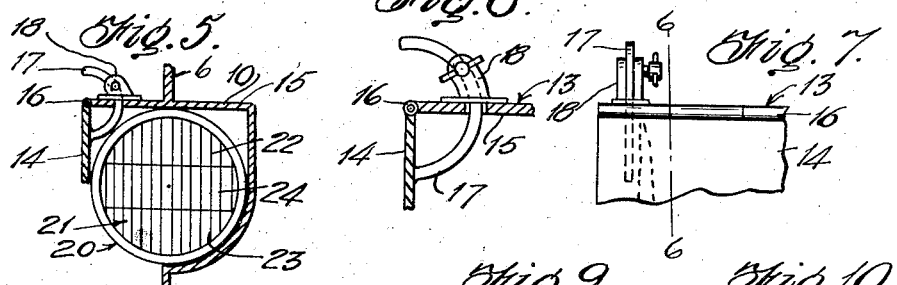
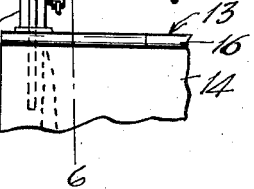
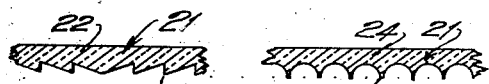
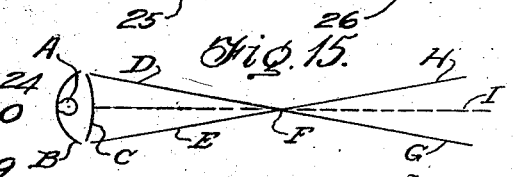

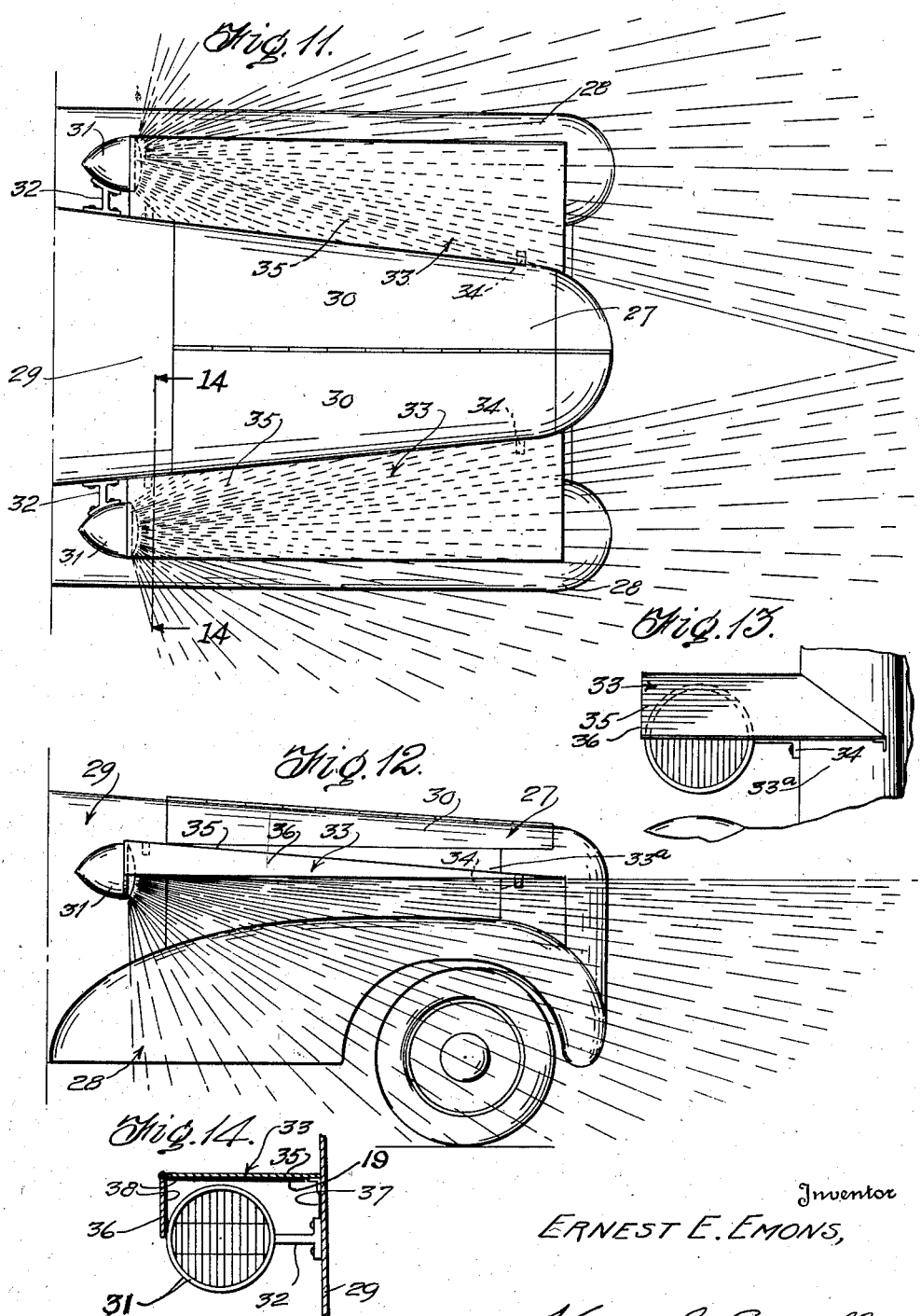

Patented Feb. 21, 1939

2,148,341

UNITED STATES PATENT OFFICE 2,148,341

GLARE PREVENTIVE SYSTEM

Ernest E. Emons, Miami, Fla.

Application August 5, 1937, Serial No. 157,632

5 Claims. (Cl. 240—8.11)

This invention relates to a glare preventive system for road vehicles of the automotive type and has for its object to provide, in a manner as hereinafter set forth, for the use of bright lights when travelling at night on a roadway without blinding the driver of an oncoming vehicle.

A further object of this invention is to provide, in a manner as hereinafter set forth, a glare preventive system for road vehicles of the automotive type whereby the dimmer means generally used in connection with the headlights of the vehicle is rendered unnecessary.

A further object of the invention is to provide, in a manner as hereinafter set forth, a glare preventive system for road vehicles of the automotive type whereby bright light rays from the headlights of the vehicle are confined to prevent the upward direction thereof and to cause them to extend forwardly, laterally, horizontally and downwardly to obtain the full benefit of all the useful light generated without glare or blinding effect upon the eyes of the driver of an oncoming vehicle.

A further object of the invention is to illuminate the sides of the vehicle by the use of the light source provided for forward illumination of the roadway.

A further object of the invention is to provide a glare preventive system which permits of the use of lights of great candle power as well as fog penetration lamps.

Another object of the invention is to provide a means for giving non-glare illumination of the roadway immediately forward of a vehicle, which can be fixed or set when the vehicle is built, so as to be permanently in adjustment.

The invention further aims to provide for bright light illumination forwardly and laterally of an automotive vehicle in a manner to prevent blinding effect relative to the driver of an oncoming vehicle thereby forming an element of safety and preventing collisions.

A further object of the invention resides in the increasing and decreasing of the spread of the light rays, laterally with respect to the sides of the vehicle and the roadway at the sides of the vehicle.

To the above ends essentially and to others which may hereinafter appear, the system consists of the novel construction, combination and arrangement of parts as will be more specifically referred to and illustrated in the accompanying drawings wherein are shown several embodiments of the invention, but it is to be understood that changes, variations and modifications may be resorted to which fall within the scope of the invention as claimed.

Figure 2:
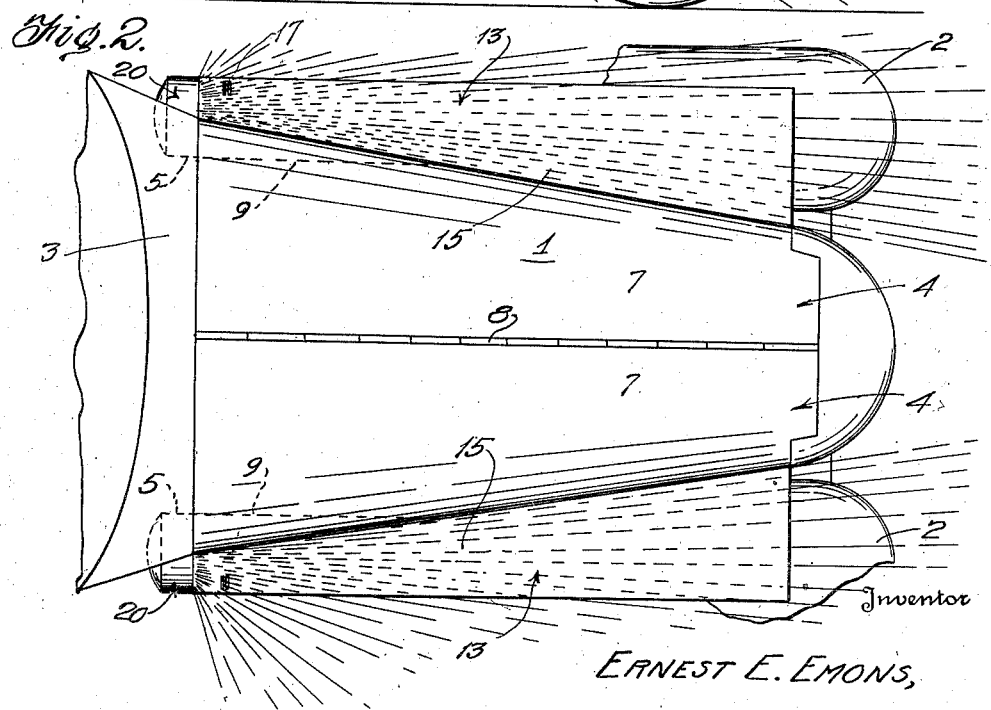

In the drawings:

Figure 1 is a fragmentary view, in side elevation, of an automotive vehicle having installed therewith a glare preventive system, in accordance with this invention, Figure 2 is a top plan of the structure shown in Figure 1, Figures 3 and 4 are sections on lines 3—3 and 4—4 respectively of Figure 2, Figure 5 is a fragmentary sectional view on line 5—5, Figure 1, Figure 6 is a detail partly in vertical section and in elevation taken on line 6—6 of Figure 7, Figure 7 is a fragmentary view in side elevation, Figure 8 is a front elevation of the lens of a headlight, Figure 9 is a section on line 9—9, Figure 8, Figure 10 is a section on line 10—10, Figure 8, Figure 11 is a fragmentary view in top plan of an automotive vehicle showing the adaptation therewith of a modified form of glare preventive system in accordance with this invention, Figure 12 is a side elevation of the structure shown in Figure 11, Figure 13 is a fragmentary view in front elevation of the structure shown in Figure 11, Figure 14 is a section on line 14—14, Figure 11, and Figure 15 is a diagrammatic view illustrating the projection of light rays from a light source and showing the rays which are deflected by the interceptor.

Referring to Figures 1 to 10 of the drawings, 1 indicates the engine hood, 2 the forward side fenders and 3 the cowl of an automotive vehicle. The hood as is usual in automotive vehicles tapers from rear to front and includes a pair of oppositely disposed hinged sections 4 of like form. The cowl 3 in the outer face of each side thereof is provided with a depression 5 closed at its rear end and having its forward end opening at the forward end of the cowl. Each hood section is of a cross section to form a pair of legs 6, 7 disposed at substantial right angles to each other. Normally the leg 6 is in the upstanding position shown. The leg 7 is horizontally disposed and extends inwardly from the upper end of leg 6. The leg 7 is hinged as at 8. The legs 6 form the upper portions of the sides of hood 1. The lower portions of the sides of hood 1 are stationary and indicated at 6ª. When the legs 6 are in upstanding position they seat on portions 6a. Each leg 6, in its outer face and lengthwise thereof, is formed with a depression 9 of the same contour, in vertical section as that of the depression 5, as well as providing a continuation of the latter when leg 6 is in an upstanding position. The depression 9 opens at its rear end at the rear end of leg 6 and gradually decreases in cross sectional area from its inner to its outer end. The depression 9 is spaced from the top and bottom of leg 6 and includes a straight top wall 10, provided from a portion of the upper section of an intercepter to be referred to, a vertically disposed inner wall 11 and an outwardly curved bottom wall 12. The walls 11, 12 are provided by an inset portion of the leg 6. The wall 10 is integral with leg 6.

Extended in lateral relation with respect to the top of depression 9, the upper end of wall 11 and the portion of leg 6 forwardly of the depression 9 is an intercepter 13 of angled contour formed of an upstanding light rays cntrolling shutter 14 and a horizontally disposed light rays arresting member or upper section 15 extending inwardly from the top of shutter 14. The latter confines the lateral extension of the light rays from the side of the vehicle to a point below the top of the engine hood. The member 15 is integral with and is bodily movable with leg 6. The inner portion of member 15 provides the top wall 10 of depression 9. The member 15 arrests the upward extension of the light rays from a point below the top of the engine hood.

The intercepter 13 is a length to extend from the rear end to the forward end of leg 6. The shutter 14 is of right angled triangular contour and so disposed whereby it will gradually decrease in width from its rear to its forward end. The inclined lengthwise edge of shutter 14 is hinged, as at 16 to the outer lengthwise straight edge of member 15. The latter gradually increases in width and inclines downwardly from its rear to its forward end. The distance of the lamp back from the front of the vehicle is preferably not less than three feet and the forward drop or downwardly slant of the member 15 from the lamp to the front of the car is preferably about one and one-half inches to the foot. The purpose of these distances and measurements is such that the interception of the light rays will not be so great as to spoil the forwardly desired illumination of the road, and at the same time will be sufficient to prevent the glare of the light into the eyes of the driver of the oncoming vehicle. The shutter 14 is angularly adjustable relative to the outer lengthwise edge of member 15. An adjustable latching member 17 is carried by shutter 14 and extends through member 15. The latter carries a keeper 18 for coaction with member 17 for latching shutter 14 in normal vertical position and when shutter 14 is adjusted from normal.

Secured within each depression 5 and extending laterally therefrom is a headlight 20 having its forward end flush with the forward end of the depression 5.

The outer faces of the inner and bottom walls of the depressions 9, the inner faces of shutters 14, lower faces of members 15 and the outer faces of the legs 6 below members 15 are treated throughout, preferably with blacking material to provide non-reflecting light rays absorbing surfaces, as indicated at 19.

The side and bottom walls of the depressions 9 and the legs 6 below members 15 forwardly of depressions 9 prevent lateral glare.

The intercepter 13 provides a combined non-reflecting and light rays absorbing means acting to prevent the light rays from travelling upwardly from the headlights, to cause the light rays to extend forwardly, horizontally and downwardly and to obtain the full benefit of all of the useful light generated without glare or blinding effect upon the eyes of the driver or an oncoming vehicle. The said means further functions to cause the light rays to illuminate the sides of the vehicle without an additional light source for such purpose, and also by the use of the same light source to provide for the illumination of the roadway forwardly of and laterally with respect to the vehicle. The said means acts as a dimmer and renders the use of other dimmer means unnecessary.

The lens of each headlight 20 is indicated 21 and is of that type provided with prisms. The upper and lower portions of each lens are indicated 22, 23 and the central portion of the lens at 24. The portions 22, 23 are of like form and have the prisms 25 thereof oppositely disposed from the sides of the vertical median of the lens. The prisms 26 of the central portion 24 are uniform. The construction of the lens is such as to tend to deliver light rays in opposite directions.

The adjustability of the shutter 14 of the intercepter 13 provides for increasing and decreasing the spread of the light rays laterally with respect to the sides of the vehicle.

The lower or straight lengthwise edge of the shutter 14 aligns normally with the horizontal median of the lens and is termed a light control line parallel to the side of the hood.

With reference to the modified form of the system shown by Figures 11 to 14 the engine hood, forward side fenders and cowl of an automobile vehicle are indicated at 27, 28, 29 respectively. The hood 27 includes a pair of oppositely disposed hinged sections 30 of like construction and of angled contour in cross section. The system as shown in Figures 11 to 14 have the headlights 31 disposed in lateral relation with respect to the sides of the cowl 29 and are carried by stationary brackets 32. In this modified form, the cowl 29 and sections 30 of the hood 27 are not formed with depressions as is the cowl 3 and hood sections 4. The hood 27 tapers from rear to front. The interceptors 33 in the modified form are of the same construction as the intercepters 13, but in lieu of being integral with the hood sections 30 each intercepter 33 is laterally supported from the stationary lower portion 33a of a hood side, below a section 30, by the coupling brackets 34 which are anchored to such lower portion and to the light rays arresting member 35 of intercepter 33. The adjustable glare controlling shutter of the intercepter 33 is indicated at 36. The member 35 and shutter 36 are constructed and arranged relative to each other in the same manner as shutter 14 and member 15 of intercepter 13. The intercepter 33 extends from a headlight 31 to the forward end of the hood side. That portion of each side of the hood 27 below the member 35 has its outer face formed in a manner to provide a non-reflecting light ray absorbing surface, as at 37, preferably by being blacked with a suitable substance. The lower face of member 35 and the inner face of shutter 36 are formed similarly throughout in the same manner to provide a non-reflecting light ray absorbing surface as at 38. The lens of each headlight 31 preferably will be similar to the lens 21.

The intercepters 33 function in the same manner as the intercepters 13.

The interception of the light rays, both upwardly and downwardly to achieve the object of this invention is at a point to be referred to. To overcome the faulty light rays at present existing in automotive headlights, it is necessary to intercept certain rays, direct rays from the filament, irregular refracted rays from the bulb, irregular reflected rays from the reflector and the irregular refracted, reflected and diffused rays from the lens, and in order to correct this conglomeration of rays, it is necessary to condense all the light at a point not too great a distance from the lamp and with the light at such point to be intercepted by the intercepter. In the instant matter it is only necessary to consider two rays, after the light has been condensed, one directed down, the other up. These rays are intersected at the point referred to and no other point will answer. With reference to Figure 15 the bulb of the headlight is indicated at A, the reflector at B, the lens at C, a ray directed down at D, a ray directed up at E and the intersection between D, E, at F. If ray D is intercepted before the point of intersection F, it will only effect the useful light G, but if ray E is intercepted at the top, as at H, beyond F, only the upper useless and blinding light will be effected. A horizontal line on a level with the center of the light is indicated at I. The intercepter from the top of lens C, should cut out or intersect line I beyond F at the greatest distance consistant with the distance between lens C and the forward end of the intercepter.

The shutter of the intercepter is adjustable, as at present various lighting requirement is had for the side of a car.

What I claim is:

1. In combination with a vehicle body and an engine hood, a non-glare headlight system, including a pair of lamps and lenses therefor positioned rearwardly of and on opposite sides of said hood, the side walls of said hood adjacent the rear end thereof being formed with an elongated upper shield disposed substantially horizontal in transverse section and extending longitudinally of said hood, an inner shield extending right angularly downwardly from said upper shield, the lower rear portion of the surface of said inner shield merging with the side wall of said hood, and an outer shield secured at its upper end to said upper shield and depending therefrom, the lower edge of said outer shield terminating above the lower end of said inner shield whereby light rays from each lamp will be projected laterally and downwardly of said hood.

2. In combination with a vehicle body and an engine hood, a non-glare headlight system including a pair of lamps and lenses therefor positioned rearwardly of and on opposite sides of said hood, the side walls of said hood adjacent the rear end thereof being formed with an elongated upper shield disposed substantially horizontal in transverse section and extending longitudinally of said hood, an inner shield extending right angularly downwardly from said upper shield, the lower rear portion of said inner shield having a concave surface merging at its lower end with the side wall of said hood, and an outer shield secured at its upper end to said upper shield and depending therefrom, the lower edge of said outer shield terminating above the lower end of said inner shield whereby light rays from each lamp will be projected laterally and downwardly of said hood, the inner edge of said upper shield diverging forwardly from the outer edge thereof, the forward end of said upper shield terminating adjacent the forward end of said hood.

3. In combination with a vehicle body and an engine hood, a non-glare headlight system including a pair of lamps and lenses therefor positioned rearwardly of and on opposite sides of said hood, the side walls of said hood adjacent the rear end thereof being formed with an elongated upper shield disposed substantially horizontal in transverse section and extending longitudinally of said hood, an inner shield extending right angularly downwardly from said upper shield, the lower rear portion of said inner shield having a concave surface merging at its lower end with the side wall of said hood, an outer shield swingably secured to the outer longitudinal edge of said upper shield, the lower edge of said outer shield terminating above the lower end of said inner shield whereby light rays from each lamp will be projected laterally and downwardly of said hood, and means at the top of the upper shield for holding the outer shield in adjusted position.

4. In combination with a vehicle body and engine hood, a non-glare headlight system including a pair of lamps and lenses therefor positioned rearwardly of and on opposite sides of said hood, the side walls of said hood adjacent the rear end thereof being formed with an elongated upper shield disposed substantially horizontal in transverse section and extending longitudinally of said hood, said upper shield being disposed at right angles to a side wall of said hood with the side wall connected to said upper shield in substantially the transverse center of the rear portion of the upper shield, an inner shield extending right angularly downwardly from said upper shield, the lower rear portion of said inner shield having a concave surface merging at its lower end with the side wall of said hood, and an outer shield secured at its upper end to said upper shield and depending therefrom, the lower edge of said outer shield terminating above the lower end of said inner shield whereby light rays from each lamp will be projected laterally and downwardly of said hood.

5. In combination with a vehicle body and an engine hood, a non-glare headlight system, including a pair of lamps and lenses therefor positioned rearwardly of and on opposite sides of said hood, the side walls of said hood adjacent the rear end thereof being formed with an elongated upper shield disposed substantially horizontal in transverse section and extending longitudinally of said hood, an inner shield extending right angularly downwardly from said upper shield, the lower rear portion of said inner shield having a concave surface merging at its lower end with the side wall of said hood, an outer shield depending from said upper shield, means hingedly securing said outer shield to said upper shield, and means carried by the upper shield and the outer shield for holding said outer shield in adjusted position.

ERNEST E. EMONS.